(12) United States Patent
Berry et al.

(10) Patent No.: US 9,842,088 B2
(45) Date of Patent: Dec. 12, 2017

(54) METHOD AND APPARATUS FOR RENDERING AN IMAGE FOR AN ENTIRE WEB PAGE ON PHYSICAL DEVICES

(71) Applicant: Springbox Labs, Inc., Austin, TX (US)

(72) Inventors: Todd Berry, Cedar Park, TX (US);
Dina Fitzpatrick, Austin, TX (US);
Brian Brooks, Austin, TX (US)

(73) Assignee: Springbox Labs, Inc., Austin, TX (US)

( * ) Notice: Subject to any disclaimer, the term of this patent is extended or adjusted under 35 U.S.C. 154(b) by 230 days.

(21) Appl. No.: 14/920,808

(22) Filed: Oct. 22, 2015

(65) Prior Publication Data
US 2016/0117810 A1   Apr. 28, 2016

Related U.S. Application Data

(60) Provisional application No. 62/067,312, filed on Oct. 22, 2014, provisional application No. 62/067,317, filed on Oct. 22, 2014.

(51) Int. Cl.
| | | |
|---|---|---|
| *G06F 3/00* | (2006.01) | |
| *G06F 17/21* | (2006.01) | |
| *G06F 11/36* | (2006.01) | |
| *G06F 3/0484* | (2013.01) | |
| *H04L 12/24* | (2006.01) | |
| *G06F 3/0482* | (2013.01) | |
| *G06F 3/0485* | (2013.01) | |
| *G06F 17/22* | (2006.01) | |
| *G06F 17/24* | (2006.01) | |
| *G06T 7/00* | (2017.01) | |
| *G06T 11/60* | (2006.01) | |

(Continued)

(52) U.S. Cl.
CPC ......... *G06F 17/211* (2013.01); *G06F 3/0482* (2013.01); *G06F 3/0485* (2013.01); *G06F 3/04842* (2013.01); *G06F 11/3664* (2013.01); *G06F 11/3672* (2013.01); *G06F 11/3688* (2013.01); *G06F 17/2247* (2013.01); *G06F 17/24* (2013.01); *G06F 17/30905* (2013.01); *G06T 7/0002* (2013.01); *G06T 11/60* (2013.01); *H04L 41/22* (2013.01); *H04L 67/025* (2013.01); *G06T 2207/20221* (2013.01); *G06T 2207/30176* (2013.01)

(58) Field of Classification Search
CPC ..................................... G06F 3/0482
USPC .......................................... 715/738
See application file for complete search history.

(56) References Cited

U.S. PATENT DOCUMENTS 9,146,675 B2 * 9/2015 Chen .................... G06F 3/04886
9,396,485 B2 * 7/2016 Freishtat ................ G06Q 30/02
(Continued)

OTHER PUBLICATIONS

Invitation to Pay Additional Fees and, Where Applicable, Protest Fee dated Jan. 21, 2016, in Application No. PCT/US2015/057024, pp. 1-7.

(Continued)

*Primary Examiner* — William Titcomb
(74) *Attorney, Agent, or Firm* — Terrile, Cannatti, Chambers & Holland, LLP (57) ABSTRACT

In at least one embodiment, a system and method described herein provides a concrete and tangible solution to solve a problem of remotely and programmatically activating and manipulating a device to capture screen shots of a complete web page and, in at least one embodiment, prevent and, if necessary, recover from device crashes.

21 Claims, 6 Drawing Sheets

(51) Int. Cl.
*H04L 29/08* (2006.01)
*G06F 17/30* (2006.01)

(56) References Cited

U.S. PATENT DOCUMENTS

| | | | |
|---|---|---|---|
| 9,411,782 B2* | 8/2016 | Harris | G06F 17/211 |
| 2010/0146488 A1 | 6/2010 | Chen et al. | |
| 2011/0161479 A1* | 6/2011 | Freishtat | G06Q 30/02 |
| | | | 709/223 |
| 2013/0263007 A1* | 10/2013 | Rao | H04L 67/06 |
| | | | 715/738 |
| 2013/0263098 A1 | 10/2013 | Duda et al. | |
| 2013/0268862 A1* | 10/2013 | Glaser | G06F 3/04847 |
| | | | 715/738 |
| 2014/0075344 A1 | 3/2014 | Bentrup | |
| 2014/0331141 A1* | 11/2014 | Tijssen | G06F 3/0482 |
| | | | 715/738 |
| 2015/0082182 A1* | 3/2015 | Lim | G06F 3/0482 |
| | | | 715/738 |
| 2015/0135044 A1* | 5/2015 | Morita | G06F 17/211 |
| | | | 715/202 |
| 2015/0177954 A1* | 6/2015 | Wei | G06F 3/0482 |
| | | | 715/738 |
| 2015/0207843 A1* | 7/2015 | Chakra | H04L 67/02 |
| | | | 715/738 |
| 2015/0220225 A1* | 8/2015 | Jiang | G06F 3/0482 |
| | | | 705/26.8 |

OTHER PUBLICATIONS

International Search Report, PCT/US2015/057024, European Patent Office, May 9, 2016, pp. 1-6.
Written Opinion, PCT/US20151057024, European Patent Office, May 9, 2016, pp. 1-10.

\* cited by examiner

METHOD AND APPARATUS FOR RENDERING AN IMAGE FOR AN ENTIRE WEB PAGE ON PHYSICAL DEVICES

CROSS-REFERENCE TO RELATED APPLICATION

This application claims the benefit under 35 U.S.C. §119 (e) and 37 C.F.R. §1.78 of U.S. Provisional Application Nos. 62/067,317 and 62/067,312, which were both filed on Oct. 22, 2014 and are both incorporated by reference in their entirety.

This application incorporates by reference the U.S. patent application having Attorney Docket No. SPRINGBOX1110, entitled "METHOD AND APPARATUS FOR RENDERING WEBSITES ON PHYSICAL DEVICES," inventors Todd Berry, Dina Fitzpatrick, and Broderick Young, filed on Oct. 22, 2015 (referred to herein as the "Berry patent application").

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to website design and testing. More particularly, embodiments disclosed herein relate to a system, method, and computer program product for rendering a website on multiple devices simultaneously and routing the results to a user as an analysis report and/or images.

BACKGROUND OF THE RELATED ART

Traditionally, websites have been designed for viewing on desktop and laptop computers having standard display sizes. Accordingly, it has been relatively easy to design websites for display on such devices. However, the proliferation of devices such as smartphones and tablet computers has resulted in a corresponding proliferation of display sizes and aspect ratios.

A typical procedure for ensuring that a website displays properly on a device has required, firstly, that the device be in a tester's possession. A website URL (Uniform Resource Locator) provides a location of a web page of the website. References herein to a website URL refer to a URL of the website that references a web page of the website. Once the device is in the tester's possession, the device's browser may be launched and the website URL (Uniform Resource Locator) typed into the browser (typically through a touch screen). The browser may then display the website on the screen. Once displayed, the tester may capture an image of the screen. The tester then may scroll down the website and perform another capture of the screen. This process is repeated for each screen page of the website. The precise process of obtaining such a screenshot and the number of screenshots for a website may vary per device and operating system. The screenshots for the website under testing may then be saved or exported by using a cable or wireless connection to a computer or sending an e-mail from the device. The resulting device images are then stitched together using photo editing software.

As can be appreciated, for a wide spectrum of devices, this can be an expensive and time-consuming proposition. Furthermore, the devices must be in the physical proximity and be physically manipulatable by a user. Advances in technology continue to bring challenges to website design and testing. Consequently, there is always room for innovations and improvements.

SUMMARY OF THE DISCLOSURE

Embodiments disclosed herein generally relate to devices that physically render web pages of a website in a testing environment. Due to variations and revisions of web pages and devices that display the web pages, the particular physical rendering and display of multiple web pages by multiple devices often yields unpredictable results. A website designer designs one or more web pages for display by multiple devices that display web pages, such as smart phones, tablet computers, laptop computers, and desktop computers. Often the devices that will access the website differ in one or more of numerous ways, such as by different operating systems, different embedded and integrated browser applications, different physical display sizes, different display resolutions, different color palettes, and different font libraries. Furthermore, many of the foregoing features of the devices are often updated or otherwise changed on a physical and/or software (including firmware and operating systems) basis. Additionally, many websites often change the content, format, graphics, or other design features.

Against this backdrop of changing devices, changing web pages of websites, and the unpredictable results of physical rendering and display of a web page on the devices, physically testing the web pages on devices of interest in an on demand environment presents a tangible and concrete technical problem. Embodiments herein provide a technical solution to overcoming the physical limitations of activating the devices for testing the web pages and returning test results to a user. Furthermore, time constraints to successfully implement web pages across multiple device platforms while utilizing a minimal amount of human resources benefits from embodiments of the technical solution described herein. In at least one embodiment, the system and method can remotely test multiple web pages, such as 10 or more, within, for example, seconds of receiving a URL.

Additionally, embodiments disclosed herein relate generally to the field of website design, specifically in the context of a designing a website for viewing on mobile devices. In some embodiments, a system includes a web application, a device service in communication with a plurality of devices, and a device application running on the devices. A tester may use the web application with a particular device service to select devices and input an URL of a website for testing. The URL and list of selected devices is provided via the web application to the device service, which causes the selected devices to load the website at the designated URL using a browser embedded in or integrated with the device application. In some embodiments, device applications running on the selected devices load the websites and provide images corresponding to entire pages for a given URL (not just what fits on a screen) to the web application via the device service.

In some embodiments, a device application may include a native browser that loads a specific website and implements a screenshot function for capturing the entire web page of a website. The screenshot function may determine when a web page is loaded and when an image of a particular screen of a page of the website should be captured; once an image of the screen is captured, the device application automatically scrolls down to the next screen of the web page and performs another screenshot capture, until the entire web page is captured. The images are transmitted to, for example, requesting tester (e.g., a web application) where the images are automatically stitched together into a single image. In at least one embodiment, the images are transmitted to an application that performs a captured image-to-target image comparison analysis as described in the Berry patent application.

Embodiments disclosed herein can provide many advantages. For example, embodiments allow a tester to test multiple devices at a given time and without having to individually activate and configure the device's web browser. Further, the device application is able to capture an image of an entirety of a web page rather than individual screenshots.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
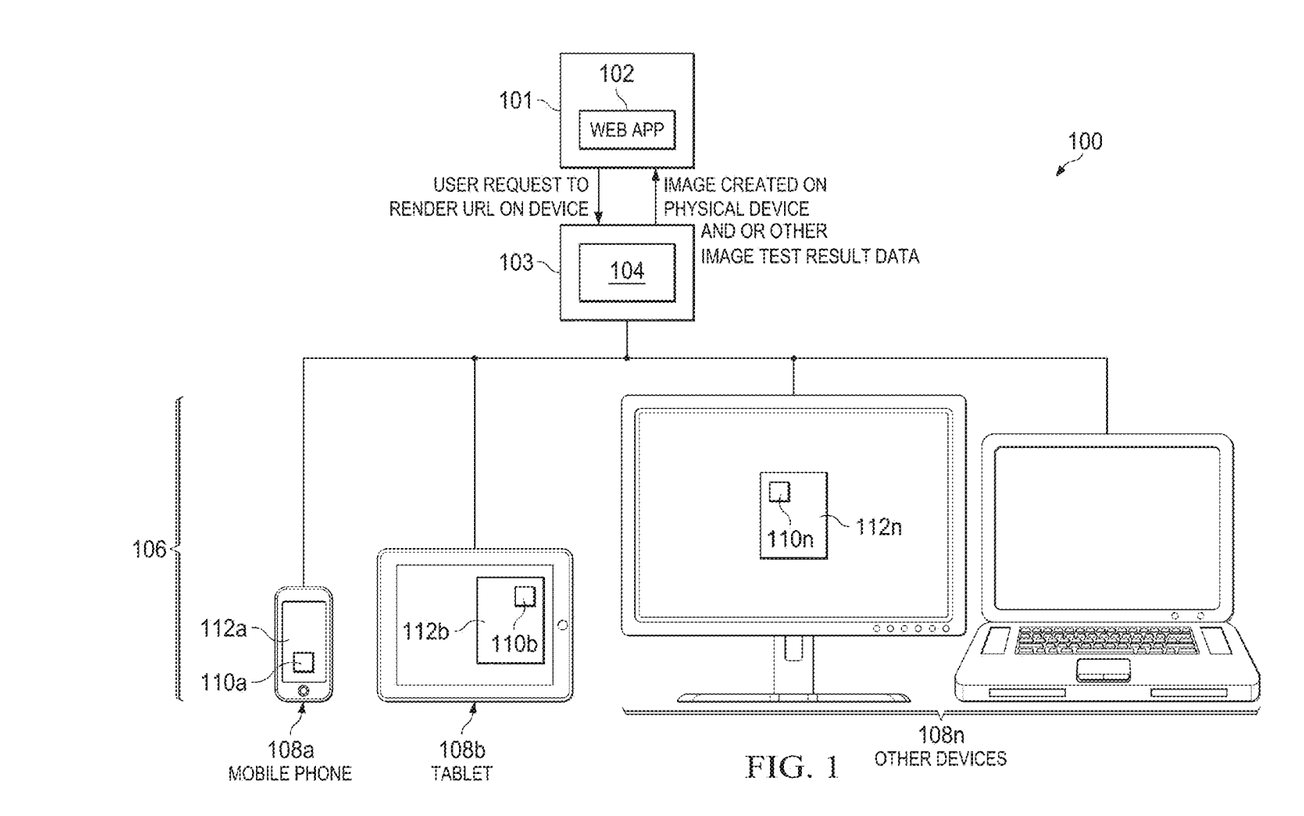
FIG. 1 depicts a diagrammatic representation of a high level network architecture in which embodiments disclosed herein may be implemented.

FIG. 1 illustrates an exemplary environment in which a website rendering method and system disclosed herein may be implemented. In the example illustrated, the system 100 includes a user device 101 running a web application 102; a device service 104; and a device farm 106 including one or more devices 108a-108n running device applications 110a-110n. The device applications 110a-110n may be specific for each device's corresponding operating system (e.g., iOS, Android, Windows Phone, etc.).

The user device 101 may be embodied as a personal computer or laptop computer, for example. The web application 102 may be an application program including a user interface and capable of communicating with the device service 104. In some embodiments, as will be discussed in greater detail below, the web application 102 may allow a tester to input an URL for testing and may select corresponding devices in device farm 106 to test the URL.

The device service 104 may be implemented on one or more servers 103, for example, a cloud-based service providing access to the device farm 106 for a fee. The device service 104 communicates with the devices 108a-108b, sending them the URL received from the web application 102. The device applications 110a-110n cause their integrated web browsers 112a-112n to open the web page. The device applications 110a-110n then capture images of the web pages and transmit them via the device service 104 to the web application 102.

Figure 2:
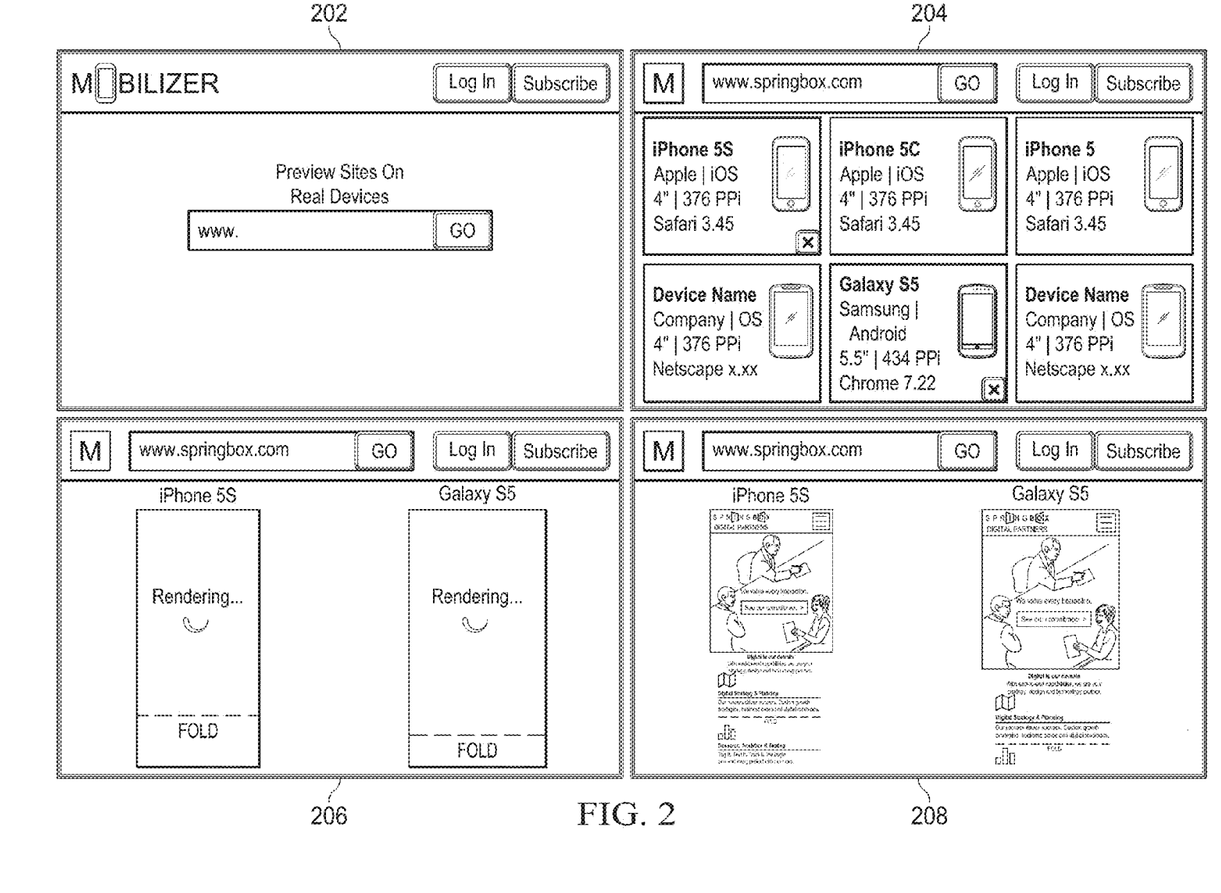
FIG. 2 depicts an example of a user interface of a web application in accordance with some embodiments.

FIG. 2 illustrates a storyboard representation of user interfaces and tester interaction therewith in greater detail. In particular, at 202, a web application (e.g., the web application 102 shown in FIG. 1) allows a tester to enter an URL that they would like to see the website rendering. The tester can then select the devices for which the website will be rendered on, as shown at 204.

In some embodiments, the request to a device service (e.g., the device service 104 shown in FIG. 1) is sent as soon as a device is selected. In this way, the lag time for the user to see the resulting images may be shortened, if not eliminated entirely. As shown at 206, after the tester is finished choosing their devices, a page is presented which immediately begins to show a rendered image from the device and continues to show the progress being made while the image is processed. The complete websites as rendered on the user devices (e.g., user devices 108a-108n shown in FIG. 1) are then displayed to the tester, at 208. After the website images are rendered, in some embodiments, the tester may optionally share and/or export them.

Advantageously, in some embodiments, the images for the websites are the entire page for the given URL, not just what would fit on a device's screen. However, the user may want to see how much information fits on the device screen. Consequently, in some embodiments, the web application may show one or more representative lines, such as a fold line, so the user can conveniently view possible page divisions.

Figure 3:
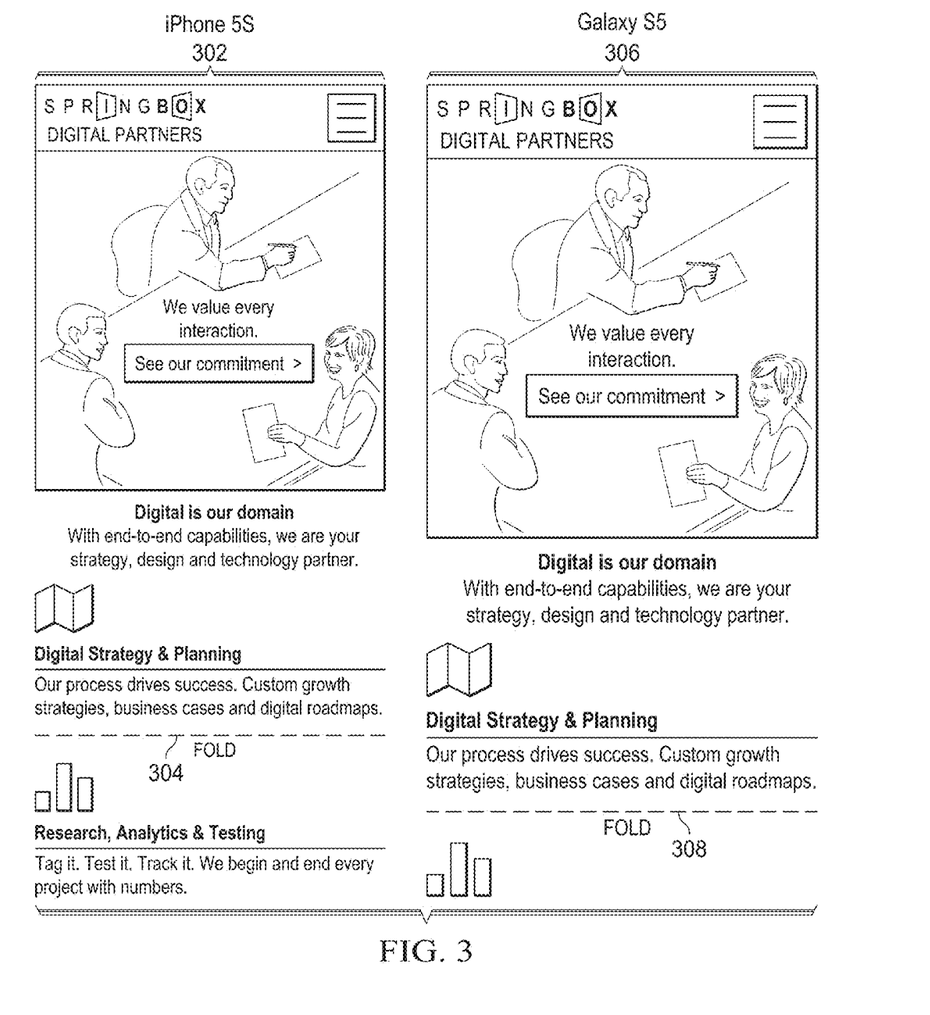
FIG. 3 depicts an example of handling of different device form factors in accordance with some embodiments.

For example, shown at 302 in FIG. 3 is an example of a website capture on an iPhone 5S device. The fold line 304 denotes where a new screen view begins. (In operation, an end user of the device would scroll down to view the remainder of the website). A similar website capture is shown at 306 for the Galaxy 5S device, with its fold line shown at 308.

In some embodiments, the rendered image may be very large, owing to the high resolution (DPI) of some mobile devices. In this case, the web application 102 may show a scaled image and allow the user to click the image to see a full screen image. This gives the user to quickly scan the image for anomalies, while still being able to zoom in.

Some embodiments may also provide the user with the ability to compare one or more images to highlight a possible problem or differences from one version of the website to the next. This feature may show one or more image and use color and/or boxes around differences. The areas that are the same may be slightly dimmed to place more emphasis on the differences.

In some embodiments, the device service 104 functions as a middleman between the web application 102 and the physical devices 108a-108n. In particular, in some embodiments, the device service 104 provides secure REST API calls: (i) Type of devices that are available to render websites; (ii) Status of the devices (availability, working on a rendering (job), etc.); and (iii) Cancel a job on a device.

In some embodiments, the web application 102 makes secure REST API calls to the device service 104 to request a URL for a given device. The device service 104 then creates a job for a device. If all devices are busy, the callback for the REST API will provide status of the job. When the job is complete, the callback will return and tell the web application 102 it is complete and provide the image for viewing.

Below is a representative sample and description of the REST API for creating a job:
POST /api/v1/jobs
Posts a new job.
  Required fields:
    'requested_device_type': The device type requested ('iPhone 5s' 'iPad Air' . . . ')
    'url': The requested URL
    'orientation': 'portrait' or 'landscape'
    'format': 'jpg' or 'png'
    'callback_url': url to call when a job is being processed
      The callback is used (via http POST) to notify of status changes for a job and to send the image to the requesting server. The images are ephemeral on Mobilizer Capture Service, so you should save the image from the callback.
    Callbacks can be made multiple times during job execution:
      1. To indicate status changes
      2. Once complete, a callback will be made with a time sensitive URL to the image. The URL requires the same authentication.
  Callback Contents (Content-Type Application/Json):

```
{
    "job"    : id,
    "status" : "loading|complete|failed",
    ["device" : {
        "name"       : "{device name}",
        "os"         : "{operating system - iOS, Android, ...}",
        "os_version" : "{os version}"
    }],
    ["url"   : {image url when status == "completed"}],
    ["error" : {error code when status == "failed"}]
}
```

Other possible fields, currently not used:
  'requested_os'
  'requested_os_version'
Returns:
  JSON representation of the full job (including the newly created 'id')

As the cloud service 104 creates jobs, in some embodiments, it sends commands to the device application 110a-110n being queued over TCP/IP. The message traffic over TCP/IP contains the URL to be rendered.

In some embodiments, the device application 108a-110n is a native application for each device 108 operating system ("OS") and is used to capture the website on that device. The native application may be deployed to devices that have network connectivity to the device service. In some embodiments, the device application can support multiple concurrent website renderings. The number supported can vary based on the computing power of the device. In some embodiments, the website image may be created as a full-size rendering of the website in either PNG or JPEG format, depending on the requestor.

Figure 4:
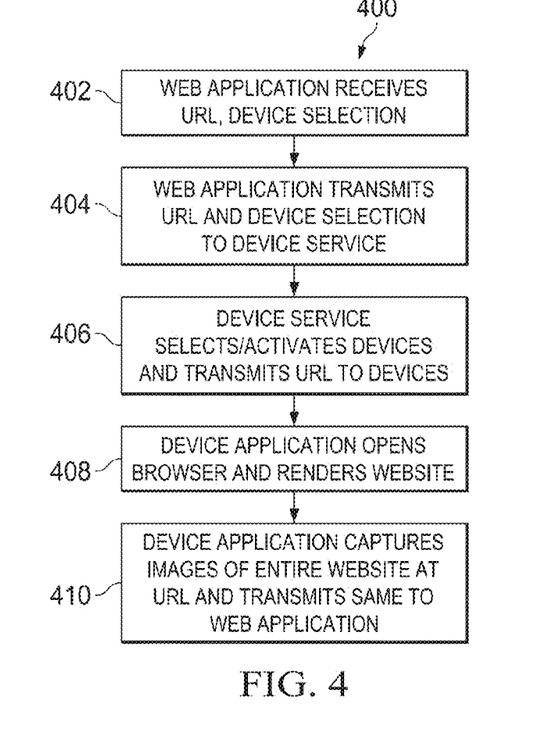
FIG. 4 depicts a flowchart illustrating operation in accordance with some embodiments.

Turning now to FIG. 4, a flowchart 400 illustrating operation of a system implementing a method according to some embodiments disclosed herein is shown. At 402, a tester or user may input an URL of a website to be tested, as well as selecting the devices on which he wishes to run the test via a web application (the web application 102 shown in FIG. 1). The URL and selected device(s) are then sent to a device service (e.g., the device service 104 shown in FIG. 1), at step 404. As noted above, this may be done by the web application using a REST API call to the device service. At step 406, the device service may select the physical devices and transmit to those physical devices the URL of the website to be rendered, for example, using TCP/IP. In response, a device application (e.g., the device application 110 shown in FIG. 1) running on a physical device opens and causes an integrated browser to open and render the website of the requested URL on the physical device, at step 408. The device application then captures images of the entire website at the URL and transmits back to the web application via the device service, at step 410. It is noted that, in some embodiments, the devices may access more than one website at a time, i.e., in response to commands from the device service, multiple physical devices may render and return (in parallel in one embodiment) images of more than one website.

Further details on the operation of the device application(s) described above can be found in the accompanying Appendix which forms part of this disclosure.

Figure 5:
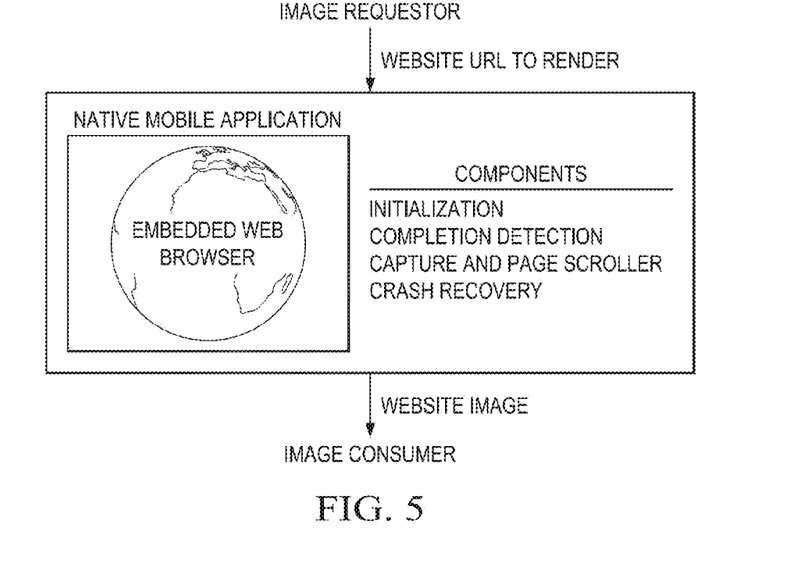
FIG. 5 depicts an example device application in accordance with some embodiments.

FIG. 5 illustrates an overview of an example device application (e.g., device application 110a, 110b, . . . , 110n shown in FIG. 1). As noted above, the device application receives from a device service (e.g., the device service 104 shown in FIG. 1) a website URL to render and returns the entire website at the URL. As shown, the device application may include an embedded browser (distinct from the device's standalone browser) and implements one or more components. These may include Initialization, Completion Detection, Capture and Page Scrolling, and Crash Recovery modules.

As will be discussed in greater detail below, the initialization module ensures that the embedded browser is reset every time is receives a request to render and capture a website. The completion detection module identifies when a website and individual components thereof, as finished rendering so that an image may be captured and returned to the requestor. The capture and page scrolling module serves to identify when a screen can be captured and when to scroll to the next screen to capture it. This may be repeated until the end of website content at the requested URL is reached. The resulting images are passed to the web application and, in some embodiments, stitched together by the web application. In one embodiment, the resulting images for the website at the URL may be stitched by the device application. Finally, the crash recovery module recovers the device application 110 from a browser 112 crash.

In some embodiments, a device application for capturing websites on a physical device may be provided for each device Operating System (OS). In some embodiments, the device application may be deployed to devices that have network connectivity to the image requestor (which can be a web application associated with an end user or a device service hosted on a server). Within this device application, a component waits for external requests to load pages and then proceeds to load and render the pages in a suitable image format depending on the request, such as PNG or JPEG format.

In some embodiments, to maximize device usage, the device application running on a physical device (e.g., a mobile device) may be able to support multiple concurrent website renderings. Depending on the mobile device's resources, specifically memory and CPU, for instance, multiple web browser instances can be spawned simultaneously to optimize device utilization. The number supported may vary based on the computing power of the device.

The initialization module is provided to ensure that the embedded browser starts in a "clean" state. In some embodiments, the following steps are performed for each site request:

The device is programmatically oriented to the requested orientation (landscape or portrait.

A new browser instance is created based on the width and height of the screen.

Browser caches and history are cleared to ensure cookies or other browser state information doesn't affect the resulting image. Often times the first visit to a page may render a popup, such as an ad, and the image should reveal that behavior.

The completion detection module determines when the website has finished loading before the image(s) is captured (Blank spaces may appear if the image is captured before the website and all its components have finished loading). Detecting when a browser has completed rendering can be difficult with modern websites because content can be loaded through iFrames or asynchronously after the browser reports that the page has loaded. Browsers also tend to report completion before all of the content is completely rendered on screen.

To ensure that the page has loaded completely so that the entire site at the requested URL can be rendered to images, the device application in accordance with embodiments may perform the following steps:

Monitor all redirect requests and iFrame loads separately to ensure they are completed.

Monitor the reported completion state from the browser and wait for all content to load. Browsers report a percent completion that is often erroneous, jumping between values because of multiple redirects and iFrames being loaded.

Scroll through the entire contents of the page before rendering to load any asynchronously loaded content and execute delayed animations.

Figure 6:
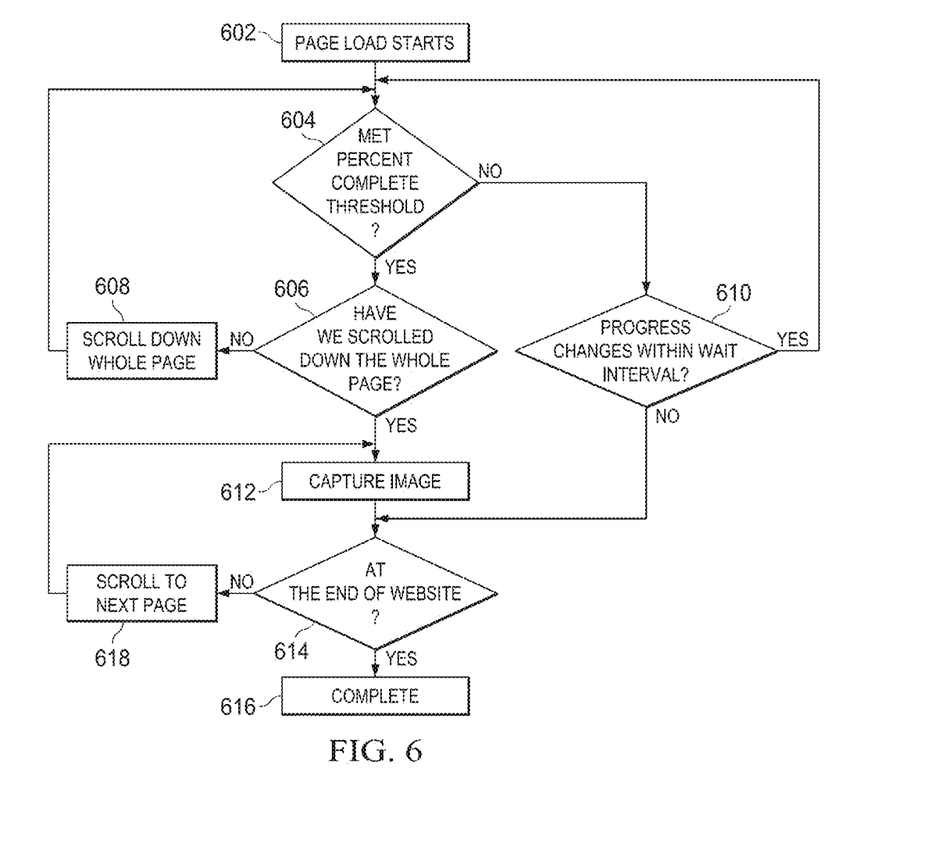
FIG. 6 depicts a flowchart illustrating a completion procedure in accordance with some embodiments.

Operation of the completion detection module is shown more particularly with regard to the flowchart of FIG. 6.

Initially, the page load starts, as shown at 602. If a completion percentage threshold is met, as determined at 604, then the completion detection module determines if the whole page has been scrolled down through, at 606. If not, the scrolling continues, at 608.

If the whole page has been scrolled down through, then the image is captured, at 612. If the end of the website is reached, as determined at 614, then the process ends, at 618. Otherwise, the next page is scrolled to, at 616, and its image is captured.

In 604, if the percentage threshold was not met, then at 610, the completion detection module determines if there has been progress in a predetermined wait interval. If so, then the process returns to 604. Otherwise, the process proceeds to 614, where it is determined if the end of the website has been reached. If so, the process ends, at 618. Otherwise, the next web page is scrolled to, at 616, and the image is captured, at 612.

In some embodiments, the capture and page scroller module scrolls down through a website and captures individual screen shots, passing them back to the requestor to be stitched into a complete image. In other embodiments, however, the stitching is performed at the mobile device itself.

However, mobile devices are memory constrained due to their form factor. The limited memory may prevent the ability to use available APIs in the web browsers to capture an entire website. While it is possible to render an image of an entire web page at the mobile device, doing so on long websites can use too much memory and crash the application. To prevent this from happening, embodiments perform the following steps:

Capture image on screen;

Scroll the browser to the next screen;

Repeat until scrolling has reached the end of the website content;

Each image is passed to the requestor, and can be stitched together

The crash recovery module is provided to recover the device application from a browser crash. (Anytime the embedded browser crashes, the application hosting the browser may crash as well).

Two factors rendering websites can cause the browser to crash:

1. The website may contain enough content or embedded content in iFrames that will cause the browser to crash.
2. On some devices and OS's, the combination of the browser rendering websites and scrolling on those sites can cause the browser to crash.

Depending on the OS, one or more of the following mechanisms may be used to recover from this state:

A background service running on the device separate from the web browser capture application (i.e., the device application) monitors the status of the web browser capture application. If the application closes, a new application is spawned and retasked to attempt the capture again. A configurable setting may be used to limit the number of attempts to retry the capture.

Built in OS mechanisms may also be used to either set the device application to be the sole application that may run on the device or the background service to always run. This ensures that on either a crash or device reboot, the background application will be executing without requiring external intervention.

In at least one embodiment, the programmatic implementation of the operations of FIG. 6 is a matter of design choice. The discussion herein generically refers to particular one of devices 108a-108n and device applications 110a-110b as respectively "device 108" and "device application 110." In at least one embodiment, to determine a percentage of web page download completion, for a device 108 running an Apple iOS operating system, the device application 110 monitors three standard iOS notifications WebViewProgressEstimateChangedNotification, Web ViewProgressStartedNotification, and WebViewProgressFinishedNotification on _documentView.webView so as to monitor the percentage of the web page that has been downloaded. The device application 110 then waits until notified that the web page has reached a certain percentage download threshold, for example, at least reached 50% of a complete loading. Once the device application 110 receives that notification that the percentage download threshold has been reached, the device application 110 continues to monitor and wait for further progress in loading the page, setting a timer on each notification such that if no further progress occurs within a fixed interval, the device application 110 will begin to programmatically capture the web page. In at least one embodiment, similar operating system functions are available for other device 108 operating systems, and the device application 110 follows the same process for each device 108.

In at least one embodiment, to programmatically scroll to a web page end, for a device 108 running an Apple iOS operating system, the device application 110 executes a standard JavaScript method that is provided by the browser, window.scrollBy, to scroll the browser. For a device running an Android operating system, the device application 110 uses the standard Android WebView scrollTo and scrollBy methods to scroll the browser.

In at least one embodiment, to programmatically monitor redirect and iFrame loads, for a device 108 running an Apple iOS operating system, the device application 110 uses a standard iOS UIWebViewDelegate shouldStartLoadWithRequest method to monitor for redirects and iframe loads. In at least one embodiment, the device application 110 rejects any attempt to load the Apple AppStore, as indicated by a URL containing itunes.apple.com, or to load a page that is not served over http or https.

In at least one embodiment, to programmatically recover from a crash, for a device 108 running an Apple iOS operating system, the device application 110 uses Guided Access mode to provide crash recovery as Guided Access will automatically relaunch an application if it crashes. For a device 108 running an Android operating system, the device application 110 utilizes an application "captureservice," which starts a second application "capture." The capture application performs all of the actual web page capture, which is the operation that is most likely to cause a crash. The captureservice starts the capture application using the standard Android Intent mechanism and the two applications then communicate using a local socket. The captureservice expects to read a message from the socket that is sent by the capture application to indicate when the capture application has completed capturing the web page. If the captureservice fails to receive that message, the device application 110 assumes the capture application has crashed and will restart the application, which in at least one embodiment is the browser 112.

In at least one embodiment, to programmatically capture status monitoring of a web browser screen, for a device 108 running either an iOS or Android operating system, the device application 110 programmatically scrolls from a top to a bottom of the web page so as to ensure all elements on the web page are loaded before beginning the screen capture process. The device application 110 then programmatically scrolls down one screen at a time, capturing the screen display and saving the screen display as an image. This process repeats until the bottom of the web page, i.e. the last screen, is reached. For an Android operating system, the device application 110 delays for one second after capturing the image.

In at least one embodiment, to programmatically set a device application to be the sole application running applies to a device 108 running an iOS operating system and not with an Android operating system. In at least one embodiment, the device application 110 uses the iOS Guided Access feature of iOS as described at https://support.apple.com/en-us/HT202612.

Figure 7:
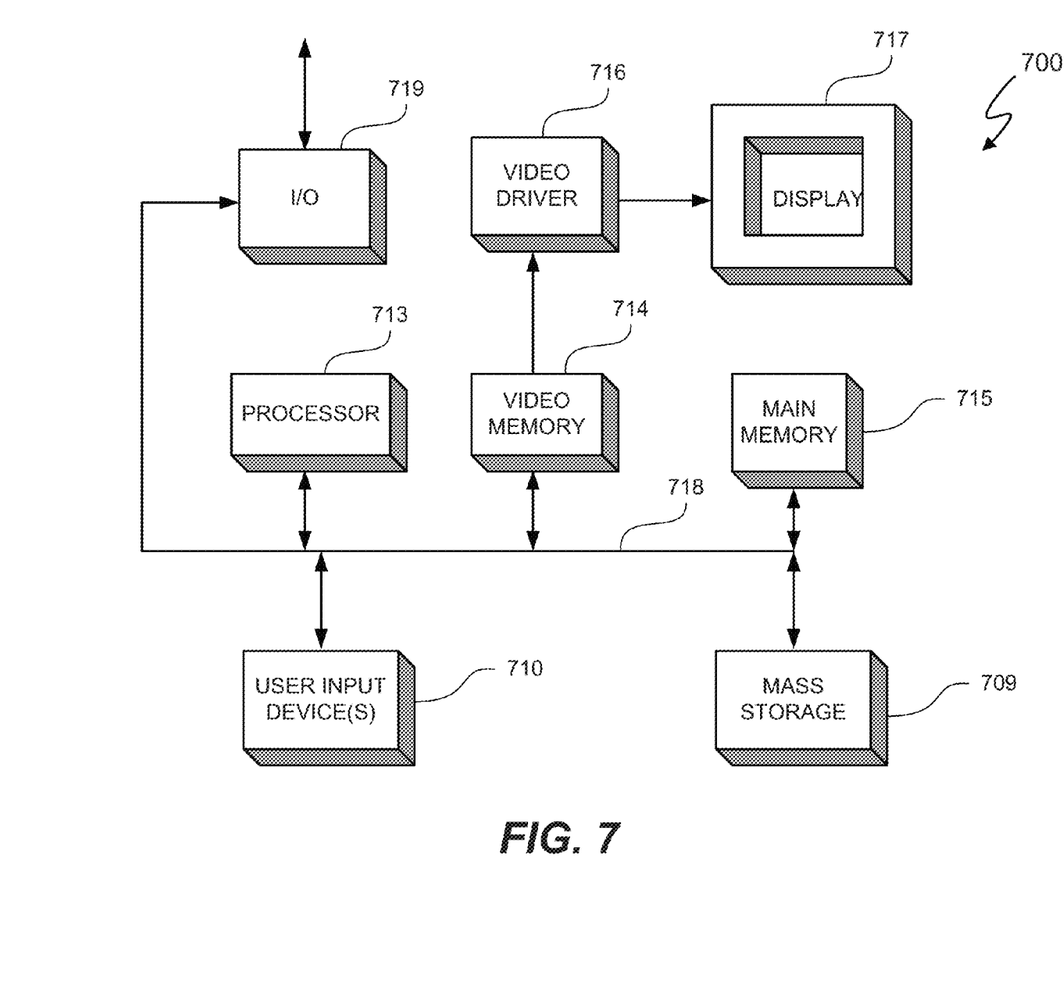
FIG. 7 depicts an exemplary device in FIG. 1.

FIG. 7 depicts an exemplary device 108. User input device(s) 710, such as a keyboard and/or mouse, are coupled to a bi-directional system bus 718. The input user device(s) 710 are for introducing user input to the computer system and communicating that user input to processor 713. The computer system of FIG. 8 generally also includes a non-transitory video memory 714, non-transitory main memory 715, and non-transitory mass storage 709, all coupled to bi-directional system bus 718 along with input user device(s) 710 and processor 713. The mass storage 709 may include both fixed and removable media, such as a hard drive, one or more CDs or DVDs, solid state memory including flash memory, and other available mass storage technology. Bus 718 may contain, for example, 32 of 64 address lines for addressing video memory 714 or main memory 715. The system bus 718 also includes, for example, an n-bit data bus for transferring DATA between and among the components, such as CPU 709, main memory 715, video memory 714 and mass storage 709, where "n" is, for example, 32 or 64. Alternatively, multiplex data/address lines may be used instead of separate data and address lines.

I/O device(s) 719 may provide connections to peripheral devices, such as a printer, and may also provide a direct connection to a remote server computer systems via a telephone link or to the Internet via an ISP. I/O device(s) 719 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 709, into main memory 715 for execution. Computer programs may also be in the form of electronic signals modulated in accordance with the computer program and data communication technology when transferred via a network.

The processor 713, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the display 717. Video amplifier 716 is well known in the art and may be implemented by any suitable means. This circuitry converts pixel DATA stored in video memory 714 to a raster signal suitable for use by display 717. Display 717 is a type of monitor suitable for displaying graphic images.

Thus, in at least one embodiment, the system and method described herein provides a concrete and tangible solution to solve a problem of remotely and programmatically activating and manipulating a device to capture screen shots of a complete web page and, in at least one embodiment, prevent and, if necessary, recover from device crashes.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, and so on. Optical, chemical, biological, quantum or nanoengineered systems, components and mechanisms may be used. The functions of the invention can be embodied in distributed, or networked systems, components and circuits, and the like. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A method comprising:
executing a non-transient program by a first electronic device that transforms the first electronic device into a machine to perform:
receiving an instruction to access a web page;
programmatically causing the first electronic device to access a web page;
loading the web page with a browser of the first electronic device;
programmatically determining if the web page has been entirely loaded, wherein the web page comprises N screens and each screen represents a portion of the web page;
for screens S(1) to S(N−1) of the web page and beginning with a first screen, wherein S(n) represents a screen and n is an integer representing an index from 1 to N, and N is an integer representing a total number of screens:
(i) programmatically rendering a screen S(n) of the web page on a display of the electronic device;
(ii) programmatically causing the first electronic device to capture an image of the screen S(n) of the web page;
(iii) programmatically causing the browser to scroll from screen S(n) to screen S(n+1);
(iv) repeating (i) through (iii) for each screen S(1) through S(N−1) and repeating (i) through (ii) for screen S(N); and
transmitting one or more images of the web page to a computer system to allow evaluation of each transmitted image of the web page.

2. The method of claim 1 wherein receiving an instruction to access a web page comprises receiving a uniform resource locator that identifies a location of the web page.

3. The method of claim 1 wherein each screen S(1) through S(N) are approximately non-overlapping.

4. The method of claim 1 further comprising executing the program by the first electronic device to perform:
programmatically stitching each image captured together to generate a digital, composite image of the web page; and
digitally inserting graphical fold lines into the composite image to indicate a break between each rendered screen of the web page; and
wherein transmitting the image to a computer system to allow the computer system to display the composite image to evaluate the rendering of the web page comprises.

5. The method of claim 1 wherein transmitting one or more images of the web page to a computer system to allow evaluation of each transmitted image of the web page comprises transmitting one or more images of the web page to a computer system to allow the computer system to display the composite image to evaluate the rendering of the web page.

6. The method of claim 1 wherein transmitting one or more images of the web page to a computer system to allow evaluation of each transmitted image of the web page comprises:
transmitting the captured images to a fourth computer system to allow the fourth computer system to compare the one or more images with one or more predetermined target images and generated image-to-target comparison results data.

7. The method of claim 1 executing the program by the first electronic device to perform:
running a background service on the device separate from a web browser screen capture application;

utilizing the background service to monitor a status of a screen capture application;

if the screen capture application closes, spawning a new application and retasking the new application to attempt the screen capture.

8. A system comprising:

a processor; and a memory, coupled to the processor, executing a program by the processor of the system that transforms the system into a machine to perform:
   receiving an instruction to access a web page;
   programmatically causing the first electronic device to access a web page;
   loading the web page with a browser of the first electronic device;
   programmatically determining if the web page has been entirely loaded, wherein the web page comprises N screens and each screen represents a portion of the web page;
   for screens $S(1)$ to $S(N-1)$ of the web page and beginning with a first screen, wherein $S(n)$ represents a screen and n is an integer representing an index from 1 to N, and N is an integer representing a total number of screens:
      (i) programmatically rendering a screen $S(n)$ of the web page on a display of the electronic device;
      (ii) programmatically causing the first electronic device to capture an image of the screen $S(n)$ of the web page;
      (iii) programmatically causing the browser to scroll from screen $S(n)$ to screen $S(n+1)$;
      (iv) repeating (i) through (iii) for each screen $S(1)$ through $S(N-1)$ and repeating (i) through (ii) for screen $S(N)$; and
   transmitting one or more images of the web page to a computer system to allow evaluation of each transmitted image of the web page.

9. The system of claim 8 wherein receiving an instruction to access a web page comprises receiving a uniform resource locator that identifies a location of the web page.

10. The system of claim 8 wherein each screen $S(1)$ through $S(N)$ are approximately non-overlapping.

11. The system of claim 8 further comprising executing the program by the processor to perform:
   programmatically stitching each image captured together to generate a digital, composite image of the web page; and
   digitally inserting graphical fold lines into the composite image to indicate a break between each rendered screen of the web page; and
   wherein transmitting the image to a computer system to allow the computer system to display the composite image to evaluate the rendering of the web page comprises.

12. The system of claim 8 wherein transmitting one or more images of the web page to a computer system to allow evaluation of each transmitted image of the web page comprises transmitting one or more images of the web page to a computer system to allow the computer system to display the composite image to evaluate the rendering of the web page.

13. The system of claim 8 wherein transmitting one or more images of the web page to a computer system to allow evaluation of each transmitted image of the web page comprises:
   transmitting the captured images to a fourth computer system to allow the fourth computer system to compare the one or more images with one or more predetermined target images and generated image-to-target comparison results data.

14. The system of claim 8 executing the program by the first electronic device to perform:
   running a background service on the device separate from a web browser screen capture application;
   utilizing the background service to monitor a status of a screen capture application;
   if the screen capture application closes, spawning a new application and retasking the new application to attempt the screen capture.

15. A non-transitory, computer readable medium comprising a program stored therein that is executable by a processor of a first computer system to transform the first computer system into a machine to perform:
   receiving an instruction to access a web page;
   programmatically causing the first electronic device to access a web page;
   loading the web page with a browser of the first electronic device;
   programmatically determining if the web page has been entirely loaded, wherein the web page comprises N screens and each screen represents a portion of the web page;
   for screens $S(1)$ to $S(N-1)$ of the web page and beginning with a first screen, wherein $S(n)$ represents a screen and n is an integer representing an index from 1 to N, and N is an integer representing a total number of screens:
      (i) programmatically rendering a screen $S(n)$ of the web page on a display of the electronic device;
      (ii) programmatically causing the first electronic device to capture an image of the screen $S(n)$ of the web page;
      (iii) programmatically causing the browser to scroll from screen $S(n)$ to screen $S(n+1)$;
      (iv) repeating (i) through (iii) for each screen $S(1)$ through $S(N-1)$ and repeating (i) through (ii) for screen $S(N)$; and
   transmitting one or more images of the web page to a computer system to allow evaluation of each transmitted image of the web page.

16. The nontransitory, computer readable medium of claim 15 wherein receiving an instruction to access a web page comprises receiving a uniform resource locator that identifies a location of the web page.

17. The nontransitory, computer readable medium of claim 15 wherein each screen $S(1)$ through $S(N)$ are approximately non-overlapping.

18. The nontransitory, computer readable medium of claim 15 further comprising executing the program by the processor to perform:
   programmatically stitching each image captured together to generate a digital, composite image of the web page; and
   digitally inserting graphical fold lines into the composite image to indicate a break between each rendered screen of the web page; and
   wherein transmitting the image to a computer system to allow the computer system to display the composite image to evaluate the rendering of the web page comprises.

19. The nontransitory, computer readable medium of claim 15 wherein transmitting one or more images of the web page to a computer system to allow evaluation of each transmitted image of the web page comprises transmitting one or more images of the web page to a computer system to allow the computer system to display the composite image to evaluate the rendering of the web page.

20. The nontransitory, computer readable medium of claim 15 wherein transmitting one or more images of the web page to a computer system to allow evaluation of each transmitted image of the web page comprises:
   transmitting the captured images to a fourth computer system to allow the fourth predetermined target images and generated image-to-target comparison results data.

21. The nontransitory, computer readable medium of claim 15 executing the program by the first electronic device to perform:
   running a background service on the device separate from a web browser screen capture application;
   utilizing the background service to monitor a status of a screen capture application;
   if the screen capture application closes, spawning a new application and retasking the new application to attempt the screen capture.

\* \* \* \* \*